United States Patent [19]

Yanagase et al.

[11] Patent Number: 6,160,070
[45] Date of Patent: Dec. 12, 2000

[54] PROCESS FOR THE PREPARATION OF POLY(METH)ACRYLIC ACID ESTER

[75] Inventors: Akira Yanagase; Seiji Tone; Toru Tokimitsu; Mitsufumi Nodono, all of Hiroshima, Japan

[73] Assignee: Mitsubishi Rayon Co., Ltd., Tokyo, Japan

[21] Appl. No.: 09/230,359

[22] PCT Filed: Jul. 24, 1997

[86] PCT No.: PCT/JP97/02574

§ 371 Date: Jan. 25, 1999

§ 102(e) Date: Jan. 25, 1999

[87] PCT Pub. No.: WO98/04595

PCT Pub. Date: Feb. 5, 1998

[30] Foreign Application Priority Data

Jul. 25, 1996 [JP] Japan ................................ 8-213287

[51] Int. Cl.[7] ................................................. C08F 120/18
[52] U.S. Cl. ......................... 526/329.7; 526/90; 526/126; 526/170; 526/223; 526/224; 526/328
[58] Field of Search ............................. 526/90, 126, 170, 526/223, 224, 328, 329.7

[56] References Cited

U.S. PATENT DOCUMENTS 4,568,705  2/1986  Grace et al. ............................ 521/137

FOREIGN PATENT DOCUMENTS 0 565 891  10/1993  European Pat. Off. .

*Primary Examiner*—Helen L. Pezzuto
*Attorney, Agent, or Firm*—Oblon, Spivak, McClelland, Maier & Neustadt, P.C.

[57] ABSTRACT

Disclosed is a process for the preparation of a poly-(meth) acrylate ester, which comprises, upon polymerization of a (meth)acrylate ester by using an organometallic compound (($C_5Me_5$)$_2$SmMe(thf) or the like) having at least one polymerization initiating site, carrying out the polymerization in the presence of a compound (acetophenone, 4-methyl-2-pentanone or the like), which contains in the molecule thereof a reactive hydrogen atom, as a chain transfer agent.

The above-described process makes it possible to control the molecular weight easily, reduce the using amount of the organometallic compound, prevent the coloring of the poly-(meth)acrylate ester and improve thermal decomposition resistance.

11 Claims, 2 Drawing Sheets

PROCESS FOR THE PREPARATION OF POLY(METH)ACRYLIC ACID ESTER

TECHNICAL FIELD

This invention relates to a preparation process of a poly(meth)acrylate ester by using a chain transfer agent.

BACKGROUND ART

A technique of preparing a poly(meth)acrylate ester by using a chain transfer agent in radical polymerization is known conventionally. In this polymerization technique, however, the terminal structure of the polymer is generally not fixed owing to the termination of disproportionation or chain transfer into the solvent, monomer or initiator employed, which makes it difficult to control the terminal structure of the polymer. This also becomes a cause for the deterioration of the thermal decomposition resistance of the polymer.

In addition, known is a technique of controlling the polymerization of a (meth)acrylate ester by using a chain transfer agent in living polymerization (Japanese Patent Application Laid-Open No. 133212/1986). In this polymerization technique, a tetracoordinate organosilicon, organotin or organogermanium compound is used as a polymerization initiator and in addition, a co-catalyst system which is a ion source, such as bifluoride, fluoride, cyanide or azide; or a suitable oxyanion, a Lewis acid or a non-anionic Lewis base is employed. Although the molecular weight of the polymer prepared by this polymerization technique can be controlled, it has not sufficient steric regularity.

On the other hand, as a technique of preparing a poly (meth)acrylate ester by using an organometallic compound, particularly, an organic rare earth metal compound, conventionally known are a preparation process (Japanese Patent Application Laid-Open No. 258808/1990) of a vinyl polymer by using a divalent rare earth metal compound and a preparation process (Japanese Patent Application Laid-Open No. 263412/1991) of a poly(meth)acrylate ester by using a trivalent rare earth metal compound. These polymerization techniques make it possible to prepare a syndiotactic poly (meth)-acrylate ester having narrow molecular weight distribution and a high molecular weight.

The above-described polymerization system formed with the divalent rare earth metal compound or trivalent rare earth metal compound as a polymerization initiator is accompanied with the drawbacks such that 1) the molecular weight of the polymer can be controlled only by a monomer/initiator ratio, 2) the organometallic compound used as an initiator remains in the resulting polymer and colors the polymer, 3) use of an expensive initiator in a large amount is required, and 4) the resulting polymer has low thermal decomposition resistance.

DISCLOSURE OF THE INVENTION

An object of the present invention is therefore to provide a process for the preparation of a poly(meth)-acrylate ester by using an organometallic compound as a polymerization initiator, which process can control the molecular weight of the polymer easily, prevent the coloring due to the initiator, reduce the using amount of the initiator and impart the polymer with high thermal decomposition resistance.

With a view to attaining the above-described object, the present inventors have carried out an extensive work. As a result, it has been found that upon polymerization of a (meth)acrylate ester by using an organometallic compound, the polymerization in the presence of a specific compound as a chain transfer agent makes it possible to reduce the amount of the polymerization initiator, control the molecular weight of the polymer easily and reduce the remaining amount of the organometallic compound, resulting in the prevention of the coloring of the poly-(meth)acrylate ester and, owing to the remaining of the residue of the chain transfer agent on one end of the polymer molecule, improvement in the thermal decomposition resistance, leading to the completion of the present invention.

In the present invention, there is thus provided a process for the preparation of a poly(meth)acrylate ester, which comprises, upon polymerization of a (meth)acrylate ester by using an organometallic compound having at least one polymerization initiating site, carrying out the polymerization in the presence of, as a chain transfer agent, a compound containing in the molecule thereof a reactive hydrogen atom.

Incidentally, the term "(meth)acrylate" as used herein means "acrylate and/or methacrylate".

BEST MODES FOR CARRYING OUT THE INVENTION

Figure 1:
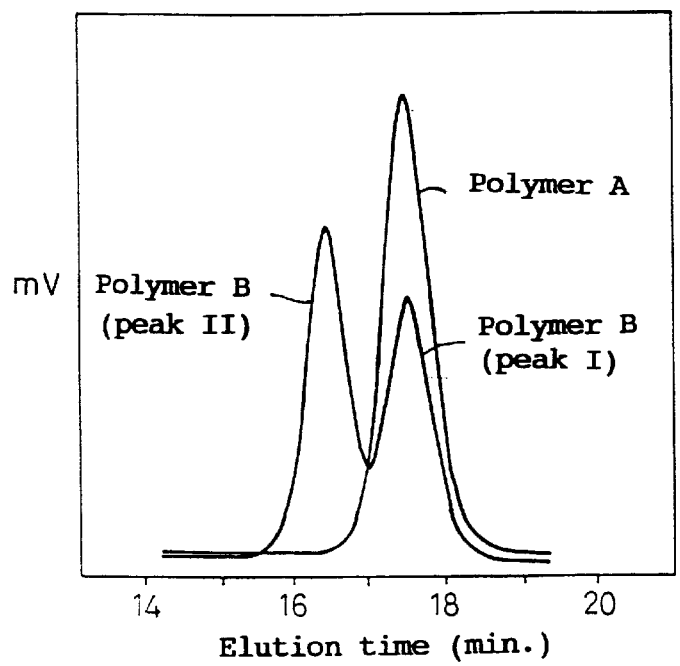
FIG. 1 illustrates GPC elution curves of Polymer A and Polymer B obtained in Example 1.

The chain transfer agent to be used in the present invention is a compound having in the molecule thereof a reactive hydrogen atom and compounds represented by the following formula (I) or (II) are preferably used.

wherein $R^1$ represents a hydrogen atom or a hydrocarbon group having carbon atoms up to 20, with the proviso that $R^1$ may optionally contain in the hydrocarbon group thereof one or more than one ether bond or thioether bond and at the same time may optionally contain in the hydrocarbon group thereof one or more than one —SH group or a functional group which is inert to the polymerization reaction under polymerizing conditions

wherein $R^2$, $R^3$ and $R^4$ each independently represents a hydrogen atom or a hydrocarbon group having carbon atoms up to 20 or any two or three of $R^2$, $R^3$ and $R^4$ are groups forming a hydrocarbon ring having carbon atoms up to 20, with the proviso that each of $R^2$, $R^3$ and $R^4$ may optionally contain in the hydrocarbon group thereof one or more than one ether bond or thioether bond and at the same time may optionally contain in the hydrocarbon group thereof one or more than one —CH—C(O)— group or a functional group which is inert to the polymerization reaction under polymerizing conditions In the above formula (I), (1) when $R^1$ represents a hydrocarbon group having carbon atoms up to 20, examples of the compound include methyl mercaptan, ethyl mercaptan, n-propyl mercaptan, isopropyl mercaptan, n-butyl mercaptan, isobutyl mercaptan, sec-butyl mercaptan, tert-butyl mercaptan, n-amyl mercaptan, isoamyl mercaptan, tert-amyl mercaptan, n-hexyl mercaptan, n-heptyl mercaptan, n-octyl mercaptan, n-nonyl mercaptan, n-decyl mercaptan, n-dodecyl mercaptan, cyclopentyl mercaptan, cyclohexyl mercaptan, phenyl mercaptan, benzyl mercaptan, 2-naphthalenethiol, o-toluenethiol, m-toluenethiol, p-toluenethiol and 5-tert-butyl-2-methylthiophenol;

(2) when $R^1$ contains in the hydrocarbon group thereof one or more than one ether bond or thioether bond, examples of the compound include 3-methoxythiophenol, 4-methoxy-α-toluenethiol and 2-mercaptoethylsulfide; and (3) when $R^1$ contains in the hydrocarbon group thereof one or more than one —SH group or functional group which is inert to the polymerization reaction under polymerizing conditions, examples of the compound include 1,2-benzenedithiol, 1,4-benzenedithiol, 2-aminobenzenethiol and 1,6-hexanedithiol.

As R in the formula (I), a sterically large group such as tert-butyl, phenyl or cycloalkyl group is preferred because it causes chain transfer effectively. From such a viewpoint, tert-butyl mercaptan, tert-amyl mercaptan, cyclopentyl mercaptan, cyclohexyl mercaptan, phenyl mercaptan, 2-naphthalenethiol, o-toluenethiol, m-toluenethiol, p-toluenethiol and 5-tert-butyl-2-methylthiophenol are particularly preferred among the above-described compounds.

It is more preferred that the hydrocarbon atom which is bonded to the —SH group in the $R^1$ group of the formula (I) is selected from the group consisting of i) secondary carbon atoms, ii) tertiary carbon atoms and iii) carbon atoms forming an aromatic group. In the case of i) or ii), $R^1$ is preferably an aliphatic hydrocarbon group having at least 4 carbon atoms. Examples of the compound in the case of i) to iii) include cyclohexyl mercaptan, tert-butyl mercaptan, tert-amyl mercaptan, phenyl mercaptan, 2-naph-thalenthiol, o-toluenethiol, m-toluenethiol, p-toluene-thiol, 5-tert-butyl-2-methylthiophenol.

In the above-described formula (II), (1) when $R^2$, $R^3$ and $R^4$ each independently represents a hydrogen atom or a hydrocarbon group having carbon atoms up to 20, examples of the compound include acetone, 3-pentanone, 2-butanone, 2-pentanone, 3-methyl-2-butanone, 4-methyl-2-pentanone, 4,4-dimethyl-2-pentanone, 5-methyl-2-hexanone, 4-heptanone, 6-methyl-5-hepten-2-one, 2-nonanone, acetophenone, propiophenone and 1-acetonaphthone;

(2) when any two or three of $R^2$, $R^3$ and $R^4$ represent a group forming a hydrocarbon ring having carbon atoms up to 20, examples of the compound include cyclopentanone, cyclohexanone, cyclohexylphenylketone, 2-n-heptylcyclopentanone and (+)-camphor;

(3) when any one of $R^2$, $R^3$ and $R^4$ contains in the hydrocarbon group thereof one or more than one ether bond or thioether bond, examples of the compound include 2-methoxy-2-methyl-4-pentanone and 4-(4-methoxyphenyl)-2-butanone; and (4) when any one of $R^2$, $R^3$ and $R^4$ contains in the hydrocarbon group thereof one or more than one —CH—C(O)— group or a functional group which is inert to the polymerization reaction under polymerizing conditions, examples of the compound include acetonitrile acetone, methyl acetoacetate, ethyl acetoacetate, methyl 4-acetylbenzoate, N,N-dimethylacetamide, 1,4-diacetylbenzene and 3',4'-di-methoxyacetophenone.

Among them, 4-methyl-2-pentanone, 4,4-dimethyl-2-pentanone, cyclohexanone, acetophenone, 3',4'-dimethoxyacetophenone and 1-acetonaphthone are preferred because of their chain transfer reactivity. Particularly, 4-methyl-2-pentanone and acetophenone are preferred.

There is no particular limitation imposed on the organometallic compound to be used as a polymerization initiator in the present invention insofar as it has at least one polymerization initiating site and has polymerization initiating capacity for a (meth)acrylate ester monomer. As the organometallic compound, at least one compound selected from the group consisting of a) trivalent organic Sc compounds, b) trivalent organic Y compounds, c) trivalent organic rare earth metal (La, Ce, Pr, Nd, Pm, Sm. Eu, Gd, Tb, Dy, Ho, Er, Tm, Yb and Lu) compounds and d) divalent organic rare earth metal (Ce, Sm, Eu and Yb) compounds.

As the organometallic compound, compounds having an unsubstituted cyclopentadienyl group or a cyclopentadienyl group which has been partially or wholly substituted by a $C_{1-20}$ hydrocarbon group are preferred, with compounds represented by the following formula (III) or (VI) being particularly preferred:

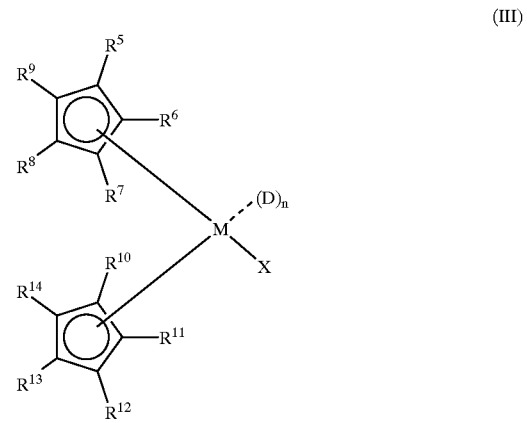

(III)

wherein $R^5$ to $R^{14}$ each independently represents a hydrogen atom, a $C_{1-5}$ hydrocarbon group or a silicon-containing hydrocarbon group and may be bonded to any one of adjacent $R^5$ to $R^{14}$, M represents Sc, Y, La, Ce, Pr, Nd, Pm, Sm, Eu, Gd, Tb, Dy, Ho, Er, Tm, Yb or Lu, X represents a hydrogen atom, a $C_{1-10}$ hydrocarbon group or a silicon-containing hydrocarbon group and the number of X is 0 or 1; or $R^5$ to $R^{14}$ and X each independently and optionally may contain one or more than one hetero atom, alkali metal, alkaline earth metal, typical metal, transition metal or rare earth metal; and D represents a solvent molecule and n stands for 0 to 3;

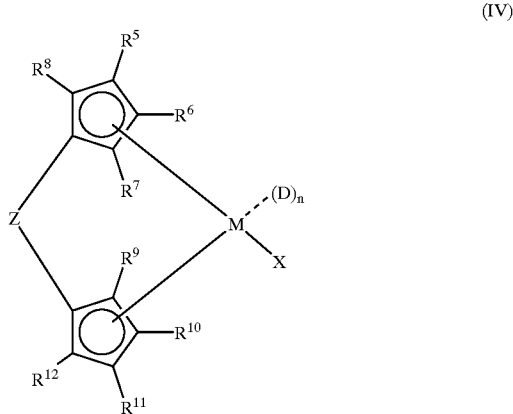

(IV)

wherein $R^5$ to $R^{12}$ each independently represents a hydrogen atom, a $C_{15}$ hydrocarbon group or a silicon-containing hydrocarbon group and may be bonded with any one of adjacent $R^5$ to $R^{12}$; M represents Sc, Y, La, Ce, Pr, Nd, Pm, Sm, Eu, Gd, Tb, Dy, Ho, Er, Tm, Yb or Lu, X represents a hydrogen atom, a $C_{1-10}$ hydrocarbon group or a silicon-containing hydrocarbon group, the number of X is 0 or 1 and Z represents a $C_{1-3}$ alkylene or alkylsilyl group; or R5 to R12, X and Z each independently and optionally may contain one or more than one hetero atom, alkali metal, alkaline earth metal, typical metal, transition metal or rare earth metal; and D represents a solvent molecule and n stands for 0 to 3.

Specific examples include $(C_5Me_5)_2Sm(thf)_2$ {thf means tetrahydrofuran (solvent molecule) which will be applied hereinafter}, $(C_5Me_5)_2Yb(thf)_2$, $(C_5Me_5)_2Eu(thf)_2$, $\{(C_5H_5)_2LU(\mu—H) \ thf)\}_2$, $\{(C_5H_5)_2Sm(\mu—H)(NEt_3)\}_2$, $\{(C_5H_5)_2Yb(\mu—H)(thf)\}_2$, $\{(C_5H_5)_2Y(\mu—H)(thf)\}_2$, $\{(C_5Me_5)_2Lu(\mu—H)\}_2$, $\{(C_5Me_5)_2Sm(\mu—H)\}_2$, $\{(C_5Me_5)_2Sc(\mu—H)\}_2$, $\{(C_5Me_5)_2La(\mu—H)\}_2$, $(C_5H_5)$ YbMe(thf), $(C5H_5)_2Yb(\mu—Me)_2AlMe_2$, $(C_5H_5)_2NdC\equiv CPh$, $(C_5Me_5)_2SmMe(thf)$, $(C_5Me_5)_2Sm(\mu—Me)_2AlMe_2$, $(C5Me_5)_2LaCH(SiMe_3)_2$, $\{(MeC_5H_4)_2Y(\mu—Me)\}_2$, $\{(C_5H_5)_2yb(\mu—NH_2)\}$, $(C_5Me_5)_2SmN(SiMe_3)_2$, $\{(C_5H_5)_2Lu(\mu—OCH=CH_2)\}_2$, $(C_5Me_5)_2La(OCEt=CHMe)(Et_2O)$, $\{(C_5H_5)_2Lu(\mu—SCMe_3)_2\}$, $(C_5Me_5)_2YbSMe(NMe_3)$, $(C_5Me_5)_2YbSPh(Et_2O)$, $\{(C_5Me_5)_2Sm(\mu—\eta_3—CH_2CHCHCH_2—)\}_2$, $\{(C_5Me_5)_2Sm(\mu—\eta_3—CH_2CHCH—)\}_2$, $\{(C_5Me_5)2Yb(\mu—\eta_3—CH_2CHCHCH_2—)\}_2$, $\{(C_5Me_5)_2Yb(\mu—\eta_3—CH_2CHCH—)\}_2$, $\{(C_5Me_5)_2Eu(\mu—\eta_3—CH_2CHCHCH_2—)\}_2$, $\{(C_5Me_5)2Eu(\mu—\eta_3—CH_2CHCH—)\}_2$ and $\{(C_5Me_5)_2Sm\}_2—(\mu—\eta_2—N_2Ph_2)$. Among them, $(C_5Me_5)_2SmMe(thf)$ which can be prepared by an easy synthesis process and has high polymerization capacity is particularly preferred.

The above-exemplified compounds can each be synthesized in accordance with the known process (H. Schumman, Chem. Rev. 95, 865(1995)). It should however be borne in mind that the synthesis process for the organometallic compound to be used in the present invention is not limited to it.

The (meth)acrylate ester to be used in the present invention is usually a compound represented by the following formula (V):

$$CH_2=C(R^{15})(CO_2R^{16}) \qquad (V)$$

wherein $R^{15}$ represents a hydrogen atom or a methyl group and $R^{16}$ represents a monovalent group selected from the group consisting of aliphatic hydrocarbon groups, aromatic hydrocarbon groups and hydrocarbon groups containing a functional group such as an ether bond or an amino group.

Specific examples include, but not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, isoamyl methacrylate, n-hexyl methacrylate, cyclohexyl methacrylate, lauryl methacrylate, allyl methacrylate, vinyl methacrylate, benzyl methacrylate, phenyl methacrylate, naphthyl methacrylate, 2-methoxyethyl methacrylate, diethylene glycol monomethyl ether methacrylate, 2-dimethylaminoethyl methacrylate, methyl acrylate, ethyl acrylate, n-propyl acrylate, isopropyl acrylate, n-butyl acrylate, isobutyl acrylate, secbutyl acrylate, tert-butyl acrylate, isoamyl acrylate, n-hexyl acrylate, cyclohexyl acrylate, lauryl acrylate, allyl acrylate, vinyl acrylate, dimethylaminoethyl acrylate and diethylene glycol ethoxylate acrylate. Among them, methyl methacrylate, ethyl methacrylate, isopropyl methacrylate, n-butyl methacrylate, methyl acrylate, n-butyl acrylate and isobutyl acrylate are particularly preferred.

The polymerization of a (meth)acrylate ester is carried out, for example, by using the above-described organometallic compound as a polymerization initiator in an inert gas and charging a predetermined amount of each of the (meth) acrylate ester and a chain transfer agent in a reaction vessel. Relative to 1 mole of the organometallic compound, 1 to 200 moles of the chain transfer agent and 100 to 10000 moles of the (meth)acrylate ester are charged, with 1 to 100 moles of the chain transfer agent and 400 to 5000 moles of the (meth)-acrylate ester relative to 1 mole of the organometallic compound being particularly preferred.

Examples of the inert gas usable for the polymerization include nitrogen, helium and argon, with argon being particularly preferred.

Although there is no particular limitation imposed on the feeding method of the (meth)acrylate ester and the chain transfer agent to the polymerization reaction system, it is preferred to feed each of them alternately or feed both of them simultaneously. The former feeding method yields a polymer which is formed by the termination of growth reaction by chain transfer and another polymer which is allowed to grow by the polymerization initiator formed after the chain transfer composed of a residue of the chain transfer agent and a residue of the organometallic compound. The molecular weight distribution curve of the resulting polymer changes, depending on the capacity of the polymerization initiator formed after the chain transfer. The former feeding method can be carried out in repetition. The latter feeding method, on the other hand, yields a polymer having a molecular weight distribution of a single peak and the molecular weight of the polymer and the using amount of the initiator can be controlled by changing the amount of the chain transfer agent.

It is preferred that the (meth)acrylate ester and chain transfer agent to be used for the polymerization are dried sufficiently in advance, for example, by using calcium hydride and Molecular Sieves and they are distilled under an inert gas just before they are provided for polymerization.

Polymerization is usually carried out at a temperature range of from −78 to 200° C., with a temperature range of from −20 to 150° C. is particularly preferred and that of from 0 to 100° C. is more preferred.

Although a solvent is not always required for the polymerization, a solvent, for example, a hydrocarbon such as benzene, toluene or xylene or an ether such as tetrahydrofuran or diethyl ether can be employed. It is preferred to use any one of the above-exemplified solvents after completely deaeration and drying. When the solvent is used, its using amount preferably ranges from 0.5 to 20 parts by weight based 15 on 1 part by weight of the monomer. Incidentally, when a chain transfer agent having low chain transfer capacity is used in a large amount, it may also be used as a polymerization solvent.

The poly(meth)acrylate ester to be prepared by the present invention features that it contains at least a polymer molecule having the residue of the chain transfer agent bonded to one end thereof. Usually, it contains both of this polymer molecule and a polymer molecule having the residue of the initiator bonded to one end thereof. In the poly(meth)-acrylate ester prepared in the present invention, although no particular limitation is imposed on the ratio of the polymer molecule having the residue of the chain transfer agent bonded to one end thereof, the ratio preferably ranges from 25 to 100%.

The present invention will hereinafter be described more specifically by the following examples, but it should be borne in mind that the present invention is not limited to or by them.

The polymers prepared in examples and comparative examples were each identified by 1H-NMR and the measurement of the molecular weight and molecular weight distribution of the resulting polymers and UV measurement were carried out by GPC (gel permeation chromatography) (measuring conditions: 35° C., chloroform, polymethyl methacrylate standard). The 5% weight loss temperature was measured by TGA (thermogravimetric analyzer) (measuring conditions: under nitrogen atmosphere, temperature range: 20 to 450° C., heating rate: 10° C./min)

EXAMPLE 1

In a 60-ml Schlenk tube sufficiently dried and purged with an argon gas, 19 ml of a solution of $(C_5Me_5)_2SmMe(thf)$ (0.1 mmol), which had been synthesized in a known process, in toluene was prepared, followed by the adjustment of the temperature in the reaction vessel to 0° C. by a magnetic stirrer. To the resulting solution, 1 ml of methyl methacrylate which had been dried using calcium hydride and Molecular Sieves was added through a syringe. After stirring for one hour, a 1 ml portion of the reaction mixture was sampled, followed by the addition of a small amount of methanol to terminate the polymerization reaction. The reaction mixture was poured into a large amount of hexane to precipitate a polymer, followed by filtration, washing and drying, whereby Polymer A was obtained.

To the above-described reaction vessel, 0.5 ml of a toluene solution of tert-butyl mercaptan (0.11 mmol), as a chain transfer agent, which had been dried using calcium hydride and Molecular Sieves was added through a syringe. After stirring for one hour to cause chain transfer, 0.9 ml of methyl methacrylate was added through a syringe. The resulting mixture was stirred for one hour. A small amount of methanol was added to the reaction mixture to terminate the polymerization reaction. The reaction mixture was then poured into a large amount of hexane to precipitate a polymer, followed by filtration, washing and drying, whereby Polymer B was obtained.

The GPC elution curves of Polymer A and Polymer B are shown in FIG. 1. Measurement results of Mn and Mw/Mn of each of Polymer A and Polymer B and yield of Polymer B are shown in Table 1.

EXAMPLE 2

In a similar manner to Example 1 except for the use of phenyl mercaptan (0.11 mmol) as a chain transfer agent, Polymer A and Polymer B were obtained.

Figure 2:
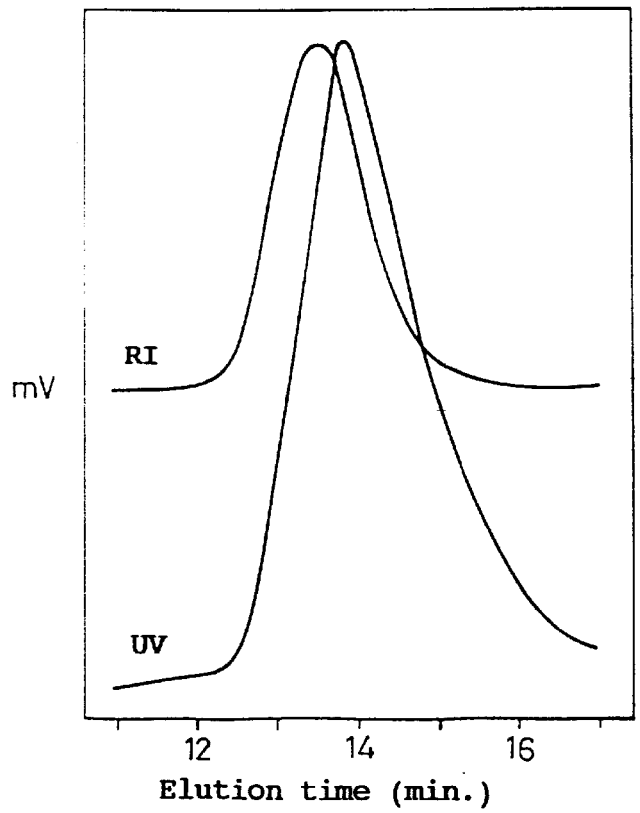
FIG. 2 illustrates GPC elution curves of Peak II of Polymer B obtained in Example 2.

Measurement results of Mn and Mw/Mn of each of Polymer A and Polymer B and yield of Polymer B are shown in Table 1. GPC-UV measurement was also carried out and in FIG. 2, a GPC elution curve of the resulting Polymer B concerning Peak II is shown. Strong ultraviolet absorption (UV) at 254 nm was observed in the polymethyl methacrylate fraction (RI) of Peak II of Polymer B, from which it has been confirmed that polymerization of methyl methacrylate was carried out by the chain transfer of phenyl mercaptan and a phenyl thioether residue derived from phenyl mercaptan was bonded to the end of the resulting polymer.

EXAMPLE 3

In a similar manner to Example 1 except for the use of 4-methyl-2-pentanone (0.11 mmol) as a chain transfer agent, Polymer A and Polymer B were obtained.

Measurement results of Mn and Mw/Mn of each of Polymer A and Polymer B and yield of Polymer B are shown in Table 1.

EXAMPLE 4

In a similar manner to Example 3 except for the use of n-butyl acrylate (3.2 ml) as a monomer to be added after chain transfer, Polymer A and Polymer B were obtained.

Figure 3:
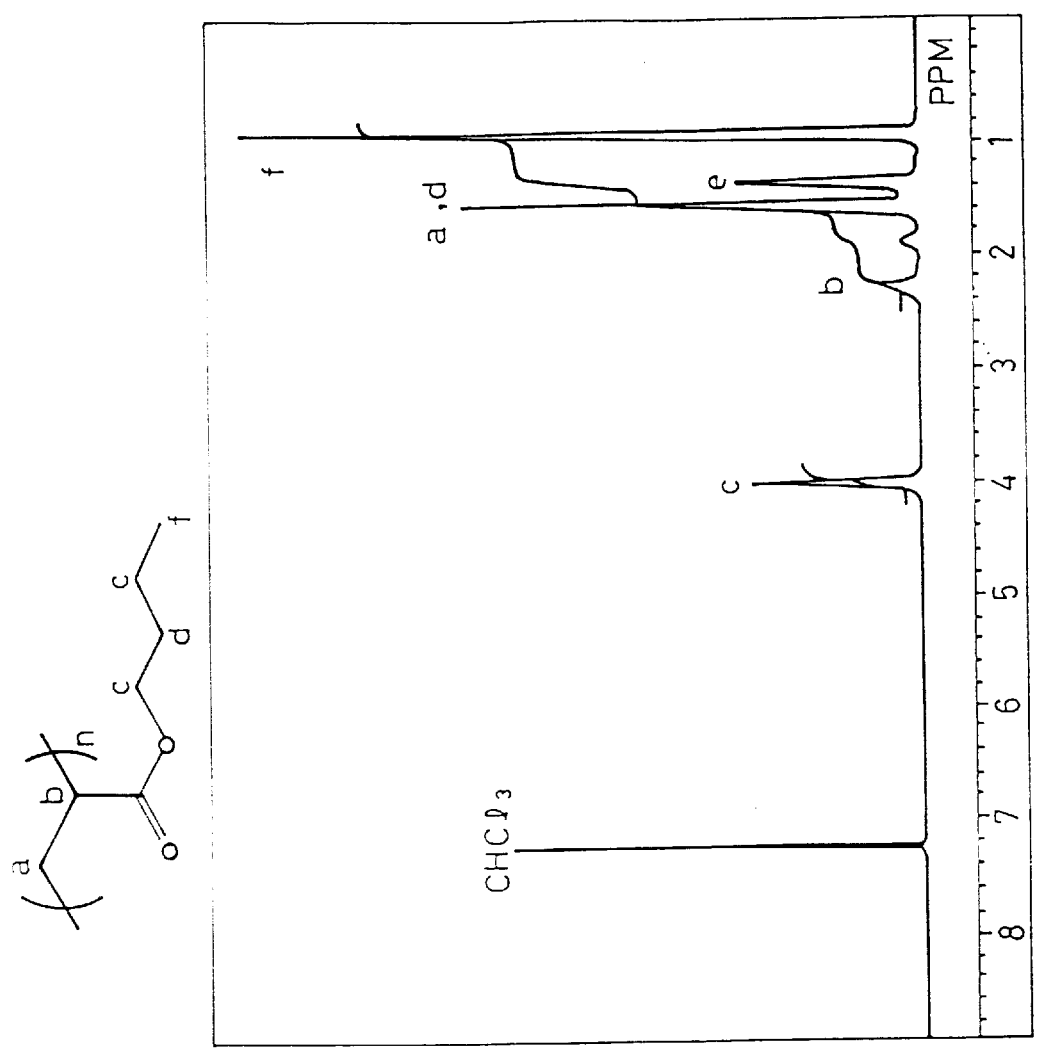
FIG. 3 is the 1H-NMR spectrum of the poly-n-butyl acrylate fraction derived from the chain transfer of Polymer B obtained in Example 4.

Measurement results of Mn and Mw/Mn of each of Polymer A and Polymer B and yield of Polymer B are shown in Table 1. Concerning Polymer B, a poly-n-butyl acrylate fraction formed as a result of the chain transfer by 4-methyl-2-pentanone was obtained and 1H-NMR measurement was carried out. Its 1H-NMR spectrum is shown in FIG. 3. From the measurement result, it has been confirmed that Polymer B is a homopolymer of poly-n-butyl acrylate.

EXAMPLE 5

In a similar manner to Example 1 except for the use of acetophenone (0.11 mmol) as a chain transfer agent, Polymer A and Polymer B were obtained.

Measurement results of Mn and Mw/Mn of each of Polymer A and Polymer B and yield of Polymer B are shown in Table 1. The GPC-UV measurement of Polymer B concerning Peak II was also carried out as in Example 2. As a result, strong ultra-violet absorption (UV) at 254 nm was observed in the polymethyl methacrylate fraction (RI) of Peak II of Polymer B, from which it has been confirmed that a benzoylmethyl residue derived from acetophenone was bonded to the end of polymethyl methacrylate.

EXAMPLE 6

In a 60-ml Schlenk tube sufficiently dried and purged with an argon gas, 9.5 ml of a solution of $(C_5Me_5)_2SmMe(thf)$ (0.05 mmol), which had been synthesized in a known process, in toluene was prepared, followed by the adjustment of the temperature in the reaction vessel to 0° C. by a magnetic stirrer. To the resulting solution, 0.1 ml of methyl methacrylate which had been dried using calcium hydride and Molecular Sieves was added through a syringe. After stirring for one hour, 0.18 ml of acetophenone, as a chain transfer agent, which had been dried using calcium hydride and Molecular Sieves and 1.0 ml of methyl methacrylate were added in the form of a mixed solution to the resulting mixture through a syringe. The resulting mixture was stirred for one hour. A small amount of methanol was added to the reaction mixture to terminate the polymerization reaction. The reaction mixture was then poured into a large amount of hexane to precipitate the polymer, followed by filtration, washing and drying.

Measurement results of Mn and Mw/Mn of the resulting polymer, a yield of the polymer and 5% weight loss temperature of the polymer are shown in Table 2.

EXAMPLE 7

In a similar manner to Example 6 except that the amount of acetophenone was changed to 0.3 ml, a polymer was obtained.

Measurement results of Mn and Mw/Mn of the resulting polymer, a yield of the polymer and 5% weight loss temperature of the polymer are shown in Table 2.

EXAMPLE 8

In a 60-ml Schlenk tube sufficiently dried and purged with an argon gas, 5 ml of methyl methacrylate which had been dried using calcium hydride and Molecular Sieves and 20 ml of a toluene solution in which 0.2 mmol of tert-butyl mercaptan had been dissolved as a chain transfer agent were charged, followed by the adjustment of the temperature in the reaction vessel to 0° C. by a magnetic stirrer. To the resulting mixture, 0.5 ml of a toluene solution of $(C_5Me_5)_2$ SmMe(thf) (0.05 mmol) synthesized in a known process was added through a syringe. After stirring for one hour, a small amount of methanol was added to the reaction mixture to terminate the polymerization reaction. The reaction mixture was then poured into a large amount of hexane to precipitate a polymer, followed by filtration, washing and drying.

COMPARATIVE EXAMPLE 2

In a similar manner to Example 8 except that a chain transfer agent was not added, a polymer was obtained (Table 2).

TABLE 1

|  | Polymer A | | Polymer B Peak I | | Polymer B Peak II | | Yield of Polymer |
|---|---|---|---|---|---|---|---|
|  | Mn | Mw/Mn | Mn | Mw/Mn | Mn | Mw/Mn | B (%) |
| Example 1 | 11,700 | 1.07 | 11,700 | 1.12 | 77,200 | 1.11 | 100 |
| Example 2 | 12,300 | 1.08 | 12,200 | 1.07 | 254,200 | 1.52 | 99 |
| Example 3 | 9,900 | 1.10 | 10,500 | 1.10 | 22,800 | 1.10 | 97 |
| Example 4 | 9,800 | 1.08 | 9,600 | 1.07 | 86,700 | 1.27 | 99 |
| Example 5 | 11,200 | 1.07 | 11,600 | 1.08 | 45,400 | 1.07 | 92 |
| Comparative Example 1 | 9,700 | 1.10 | 19,700 | 1.10 | — | — | 100 |

(Note)
Yield of Polymer (B) (%) = ([weight of polymer formed]/[weight of monomer added]) × 100

TABLE 2

|  | Theoretical molecular weight of polymer without chain transfer agent | Polymer obtained using chain transfer agent | | Yield of polymer | 5% Weight loss temper- |
|---|---|---|---|---|---|
|  | Mn | Mn | Mw/Mn | (%) | ature (° C.) |
| Example 6 | 22,000 | 16,500 | 1.51 | 80 | 347.3 |
| Example 7 | 22,000 | 14,500 | 1.30 | 76 | 350.1 |
| Example 8 | 100,000 | 33,700 | 1.78 | 91 | 347.9 |
| Example 9 | 100,000 | 35,200 | 1.55 | 74 | 342.0 |
| Example 10 | 100,000 | 23,800 | 1.91 | 93 | 353.2 |
| Example 11 | 100,000 | 15,600 | 2.14 | 92 | 360.4 |
| Comparative Example 2 | 100,000 | 102,000 | 1.15 | 95 | 326.6 |

(Note)
Yield of polymer (%) ([weight of polymer formed]/[weight of monomer added]) × 100

Measurement results of Mn and Mw/Mn of each of the resulting polymer, yield of the polymer and 5% weight loss temperature of the polymer are shown in Table 2.

EXAMPLE 9

In a similar manner to Example 8 except for the use of 4-methyl-2-pentanone (0.45 mmol) as a chain transfer agent, a polymer was obtained (Table 2).

EXAMPLE 10

In a similar manner to Example 8 except that the amount of tert-butyl mercaptan was changed to 0.45 mmol, a polymer was obtained (Table 2).

EXAMPLE 11

In a similar manner to Example 8 except that the amount of tert-butyl mercaptan was changed to 0.95 mmol, a polymer was obtained (Table 2).

COMPARATIVE EXAMPLE 1

In a similar manner to Example 1 except that a chain transfer agent was not added, Polymer A and Polymer B were obtained. Measurement results of Mn and Mw/Mn of each of Polymer A and Polymer B and the yield of Polymer B are shown in Table 1.

CAPABILITY OF EXPLOITATION IN INDUSTRY

According to the present invention, in the preparation of a poly(meth)acrylate ester by using an organometallic compound as a polymerization initiator, the molecular weight of the polymer can be controlled easily, the coloring of the polymer due to the initiator can be prevented, the using amount of the initiator can be reduced and the polymer having high thermal decomposition resistance can be prepared at a low cost.

The poly(meth)acrylate ester prepared according to the present invention has desired molecular weight distribution, is less colored and has excellent heat resistance so that it is useful as a material for film or sheet, coating material or molding or forming material.

What is claimed is:

1. A process for the preparation of a poly(meth)-acrylate ester, which comprises, upon the polymerization of a (meth) acrylate ester by using an organometallic compound having at least one polymerization initiating site, carrying out the polymerization in the presence of, as a chain transfer agent, a compound containing in the molecule thereof a reactive hydrogen atom.

2. A process according to claim 1, wherein the (meth)-acrylate ester and the chain transfer agent are fed alternately.

3. A process according to claim 1, wherein the (meth)-acrylate ester and the chain transfer agent are fed simultaneously.

4. A process according to claim 1, wherein the chain transfer agent is a compound represented by the following formula (I):

$$(R^1)SH \qquad (I)$$

wherein $R^1$ represents a hydrogen atom or a hydrocarbon group 20 having carbon atoms up to 20, with the proviso that $R^1$ may optionally contain in the hydrocarbon group thereof one or more than one ether bond or thioether bond and at the same time may optionally contain in the hydrocarbon group thereof one or more than one —SH group or a functional group which is inert to the polymerization reaction under polymerizing conditions.

5. A process according to claim 4, wherein in the formula (I), a carbon atom bonded to the —SH group in the $R^1$ group is selected from the group consisting of i) a secondary carbon atom, ii) a tertiary carbon atom and iii) a carbon atom forming an aromatic group.

6. A process according to claim 1, wherein the chain transfer agent is a compound represented by the following formula (II):

$$(R^2)(R^3)CHC(O)(R^4) \qquad (II)$$

wherein $R^2$, $R^3$ and $R^4$ each independently represents a hydrogen atom or a hydrocarbon group having carbon atoms up to 20 or any two or three of $R^2$, $R^3$ and $R^4$ are groups forming a hydrocarbon ring having carbon atoms up to 20, with the proviso that each of $R^2$, $R^3$ and $R^4$ may optionally contain in the hydrocarbon group thereof one or more than one ether bond or thioether bond and at the same time may optionally contain in the hydrocarbon group thereof one or more than one —CH—C(O)— group or a functional group which is inert to the polymerization reaction under polymerizing conditions.

7. A process according to claim 6, wherein the chain transfer agent is 4-methyl-2-pentanone.

8. A process according to claim 6, wherein the chain transfer agent is acetophenone.

9. A process according to claim 1, wherein the organometallic compound is at least one compound selected from the group consisting of a) trivalent organic Sc compounds, b) trivalent organic Y compounds, c) trivalent organic rare earth metal (La, Ce, Pr, Nd, Pm, Sm, Eu, Gd, Tb, Dy, Ho, Er, Tm, Yb and Lu) compounds and d) divalent organic rare earth metal (Ce, Sm, Eu and Yb) compounds.

10. A process according to claim 9, wherein the organometallic compound contains an unsubstituted cyclopentadienyl group or a cyclopentadienyl group which has been partially or wholly substituted with a $C_{1-20}$ hydrocarbon group.

11. A poly(meth)acrylate ester composition which is obtained by the process as claimed in claim 1 and at least contains a polymer molecule having a residue of said chain transfer agent bonded to one end thereof.

* * * * *